United States Patent [19]
Miyata et al.

[11] Patent Number: 5,089,950
[45] Date of Patent: Feb. 18, 1992

[54] PART PROFILE INPUT METHOD

[75] Inventors: Mitsuto Miyata; Teruyuki Matsumura, both of Tokyo; Noritake Nagashima, Kanagawa, all of Japan

[73] Assignee: Fanuc Ltd, Minamitsuru, Japan

[21] Appl. No.: 397,455

[22] PCT Filed: Dec. 13, 1988

[86] PCT No.: PCT/JP88/01260
§ 371 Date: Aug. 14, 1989
§ 102(e) Date: Aug. 14, 1989

[87] PCT Pub. No.: WO89/06004
PCT Pub. Date: Jun. 29, 1989

[30] Foreign Application Priority Data
Dec. 17, 1987 [JP] Japan .................. 62-319388

[51] Int. Cl.$^5$ .............. G05B 19/403; G06F 3/153; G06F 15/40
[52] U.S. Cl. ................ 364/191; 364/474.22; 364/DIG. 1; 395/100; 395/500
[58] Field of Search ............ 364/191, 521, 474.22, 364/474.26

[56] References Cited

U.S. PATENT DOCUMENTS

| | | | |
|---|---|---|---|
| 4,490,781 | 12/1984 | Kishi et al. | 364/191 |
| 4,513,366 | 4/1985 | Munekata et al. | 364/191 |
| 4,788,636 | 11/1988 | Shiratori et al. | 364/191 |
| 4,868,761 | 9/1989 | Hayashi | 364/191 |
| 4,901,220 | 2/1990 | Matsumura et al. | 364/474.26 |
| 4,928,221 | 5/1990 | Belkhiter | 364/191 |

FOREIGN PATENT DOCUMENTS 121443 7/1982 Japan .

Primary Examiner—Jerry Smith
Assistant Examiner—Allen M. Lo
Attorney, Agent, or Firm—Staas & Halsey

[57] ABSTRACT

A method for inputting a part profile which includes a standard or repeating shape. If a pattern profile input is requested at the time of a part profile input operation, a profile menu is displayed in a software key area (13b). When a pattern profile is selected by the profile menu, the selected pattern profile, e.g., a pattern view (CGP) of a series of grooves is displayed in conversational screen display area (13a) and a message (DQS) calling for various dimensions is displayed. The profile of the series of grooves is specified based on data entered in response to the message.

4 Claims, 18 Drawing Sheets

PART PROFILE INPUT METHOD

BACKGROUND OF THE INVENTION a. Field on the Invention

This invention relates to a part profile input method for entering a part profile using arrow keys and, more particularly, to a part profile input method for specifying a part profile which includes a repeating shape and standard shape.

b. Description of the Related Art

An automatic programming system is available in which a conversational display and a function key (soft key) display are each presented in accordance with each step of a plurality of data input steps, a specific function key (soft key) on the function key display is pressed to thereby execute processing conforming to the function, and an NC program is prepared using data input while referring to the conversational display.

An automatic programming system of this kind, which will be described with reference to FIG. 16, creates NC data for a lathe by the following steps:

(1) a first step of selecting execution of "AUTOMATIC PROGRAMMING";

(2) a second step of selecting data to be inputted, or in other words, a step to be executed next;

(3) a third step of selecting the material of a blank;

(4) a fourth step of setting surface roughness;

(5) a fifth step of selecting a drawing format;

(6) a sixth step of inputting the blank profile and the dimensions thereof;

(7) a seventh step of inputting a part profile and the dimensions thereof;

(8) an eighth step of inputting the machining reference point and turret position;

(9) a ninth step of selecting a machining process;

(10) a tenth step of selecting a tool and inputting tool data;

(11) an eleventh step of deciding machining conditions;

(12) a twelfth step of inputting cutting direction;

(13) a thirteenth step of inputting cutting limits;

(14) a fourteenth step of inputting whether or not an area is to be cut by the same tool; and

(15) a fifteenth step of computing a tool path (i.e. of preparing NC data).

In accordance with these steps, predetermined message screens (conversational screens) are successively displayed on a display screen. An operator responds to these messages by entering the necessary data from a keyboard. Finally, an NC program (NC data) for a lathe is created using all of the entered data.

In the part profile input step (the seventh step) of this automatic programming, a prompt (ES= ) calling for a part profile element is displayed on the display screen, as shown in FIG. 17. In response to this prompt, arrow keys ( ↑ , → , ↓ , ← , ↗ , ↘ , ↙ , ↖ , ↺ , ↻ ), a thread-cutting key, a chamfering key (C key), a rounding key (R key), a grooving key (G key) and a corner-removal key, which are provided on a keyboard, are operated in accordance with the part profile while a design drawing is observed. The part profile is thus input. Whenever a single part profile element is input using an arrow key, a prompt calling for the dimensions of this element is displayed. In response to this prompt, dimensions taken from the design drawing are input, whereupon profile element symbols PFS and graphic images PFG of these profile elements appear on the display screen. For example, when linear elements are inputted by pressing the arrow keys indicated by ↑ , → , ↓ , ← , ↗ , ↘ , ↙ , ↖ , prompts appear calling for the X coordinate (X) of the end point of the straight line, the Z coordinate (Z) of this end point, whether or not this straight line contacts the preceding profile element or the next profile element, the angle (A) which the straight line forms with the Z axis, etc. The dimensions written on the drawing are entered in response to these prompts. However, when the prescribed dimensions are not written on the drawing (as in the case of the angle formed with the Z axis, for example), this input is not required.

When a circular arc is indicated by pressing the arrow keys indicated by ↺ and ↻ , prompts appear calling for the X and Z coordinates (X,Z) of the end point of the circular arc, the X and Z coordinates (X,Z) of the center of the circular arc, the radius R of the circular arc, and whether the arc contacts the preceding profile element or the next profile element. The dimensions written on the drawing are inputted in response to these prompts.

When chamfering is indicated by the C key, a prompt calling for the amount of chamfering appears. When rounding is indicated by the R key, a prompt inquiring about the radius of rounding is displayed. In response, the dimensions are entered in similar fashion.

When entry of all profile elements is completed, all of the profile element symbols PFS of the part profile and the overall part profile figure PFG are displayed on the display screen.

In the part profile input step, there are cases where it is desired to enter a repeating shape such as a series of grooves or a standardized shape, e.g., a shape for which the machining profile is standardized as in the case of, for example, a trapezoidal groove or nesting shape. FIG. 18 is a view for entering a profile having a series of grooves. In such case, in accordance with the conventional part profile input method, an arrow key, grooving key (G key) and, if necessary, the chamfering key (C key) and rounding key (R key) provided on the keyboard must be operated for every groove, the dimensions of the elements must be entered whenever an arrow key is pressed, and the same operations must be performed repeatedly a number of times equivalent to the number of grooves.

Also, when entering a standardized shape such as a trapezoidal groove or nesting shape, the shape must be specified on each occasion using arrow keys a number of times even though the shape is standardized and frequently appears.

Accordingly, an object of the present invention is to provide a part profile input method in which, when entering a frequently used shape, such as a repeating shape or standardized shape, the speed and operability of the part profile input operation can be improved by eliminating the laborious task of pressing arrow symbol keys and dimension input keys each time an input is made.

SUMMARY OF THE INVENTION

In part profile input method according to the invention, a plurality of profile menus for designating the profile patterns of repeating shapes and standardized shapes contained in a part profile are provided, a desired profile pattern is selected using the profile menus, the selected pattern profile is displayed on a display screen, a message regarding various dimensions is displayed, and a repeating shape or standardized shape is specified based on data entered in response to the message.

DESCRIPTION OF THE PREFERRED EMBODIMENT

Figure 1:
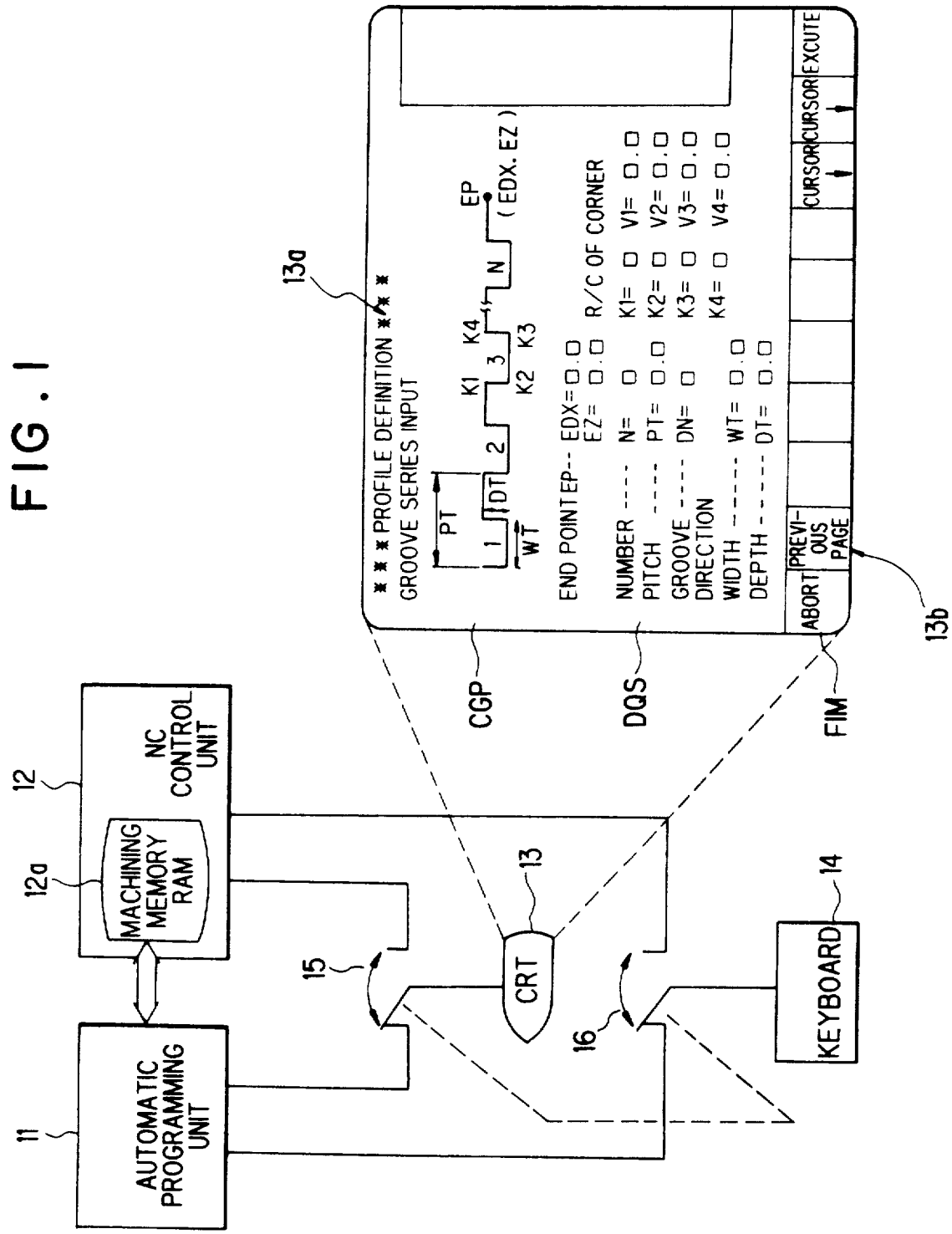
FIG. 1 is a block diagram of an NC apparatus having an automatic programming function for realizing the method of the present invention.

In FIG. 1, numeral 11 denotes an automatic programming unit, 12 denotes an NC control unit, 13 denotes a graphic display unit (CRT), 14 denotes a keyboard, and 15, 16 denote changeover units. The changeover units 15, 16 are illustrated as being switches for the sake of the description. In actuality, however, changeover is effected by software processing.

The automatic programming unit 11 and NC control unit 12 are of microcomputer construction and incorporate an internal processor, a control program memory (ROM) and a RAM.

Figure 2:
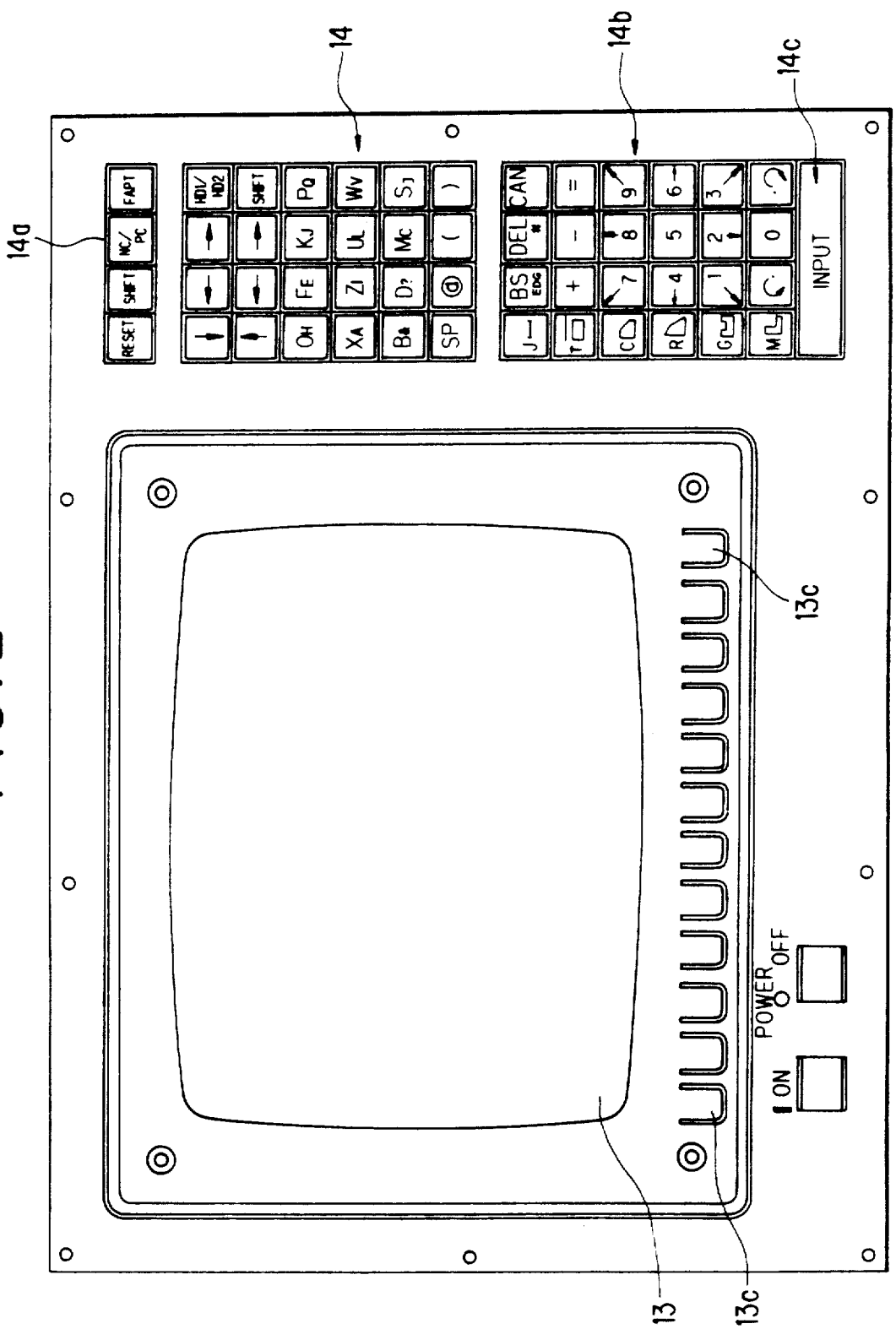
FIG. 2 is an external view of a CRT/MDI unit in the NC apparatus.
Figure 3:
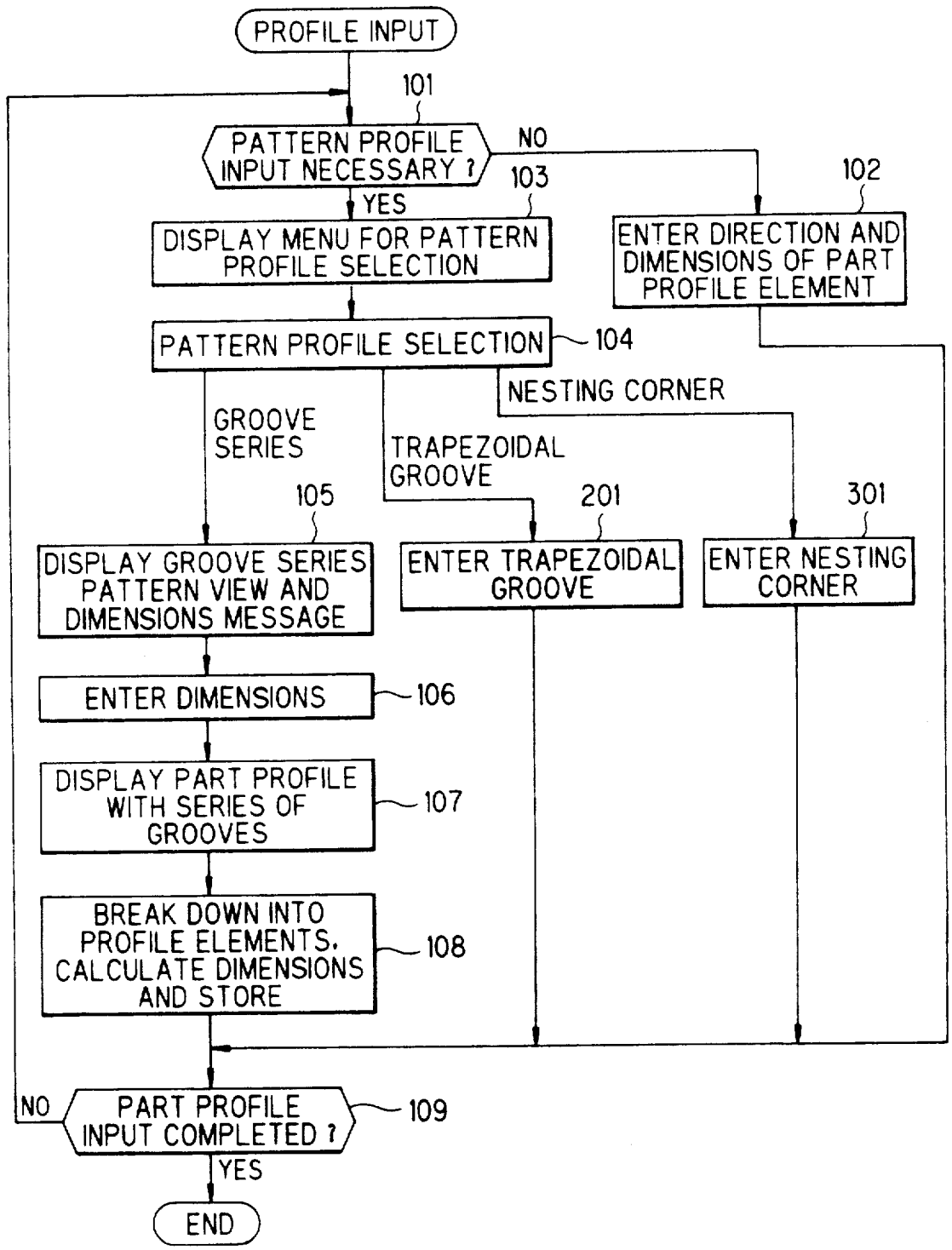
FIG. 3 is a flowchart of part profile input processing according to the present invention.

The graphic display unit 13 and keyboard 14 are integrated into a single unit, as shown in FIG. 2, which is usually referred to as a CRT/MDI unit. As shown in FIG. 1, the display screen is divided into a conversational display area 13a and a soft key area 13b. Keys 13c, 13c (see FIG. 2)... are provided to correspond to the soft key area. Pressing one of the keys enables the corresponding function displayed in the soft key area to be inputted. The keyboard 14 has an NC mode/automatic programming mode selection key 14a and a key group 14b, which includes keys serving as both arrow and numeric key, as well as the C key, R key and G key. Numeral 14c denotes an input key.

Part profile input according to the invention will now be described.

Figure 4:
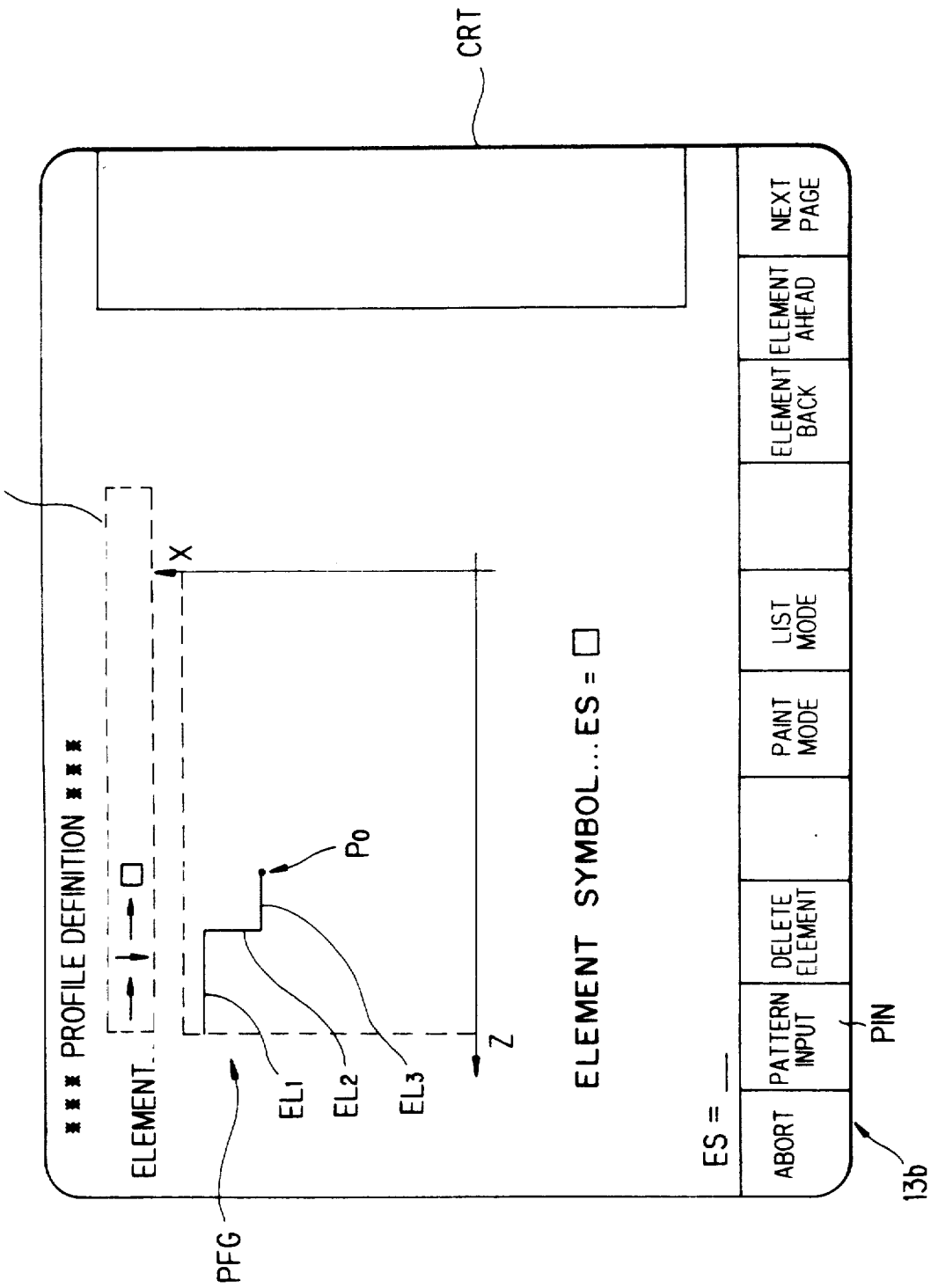
FIGS. 4 and 5 are examples of conversational displays of pattern profile selection.
Figure 16:
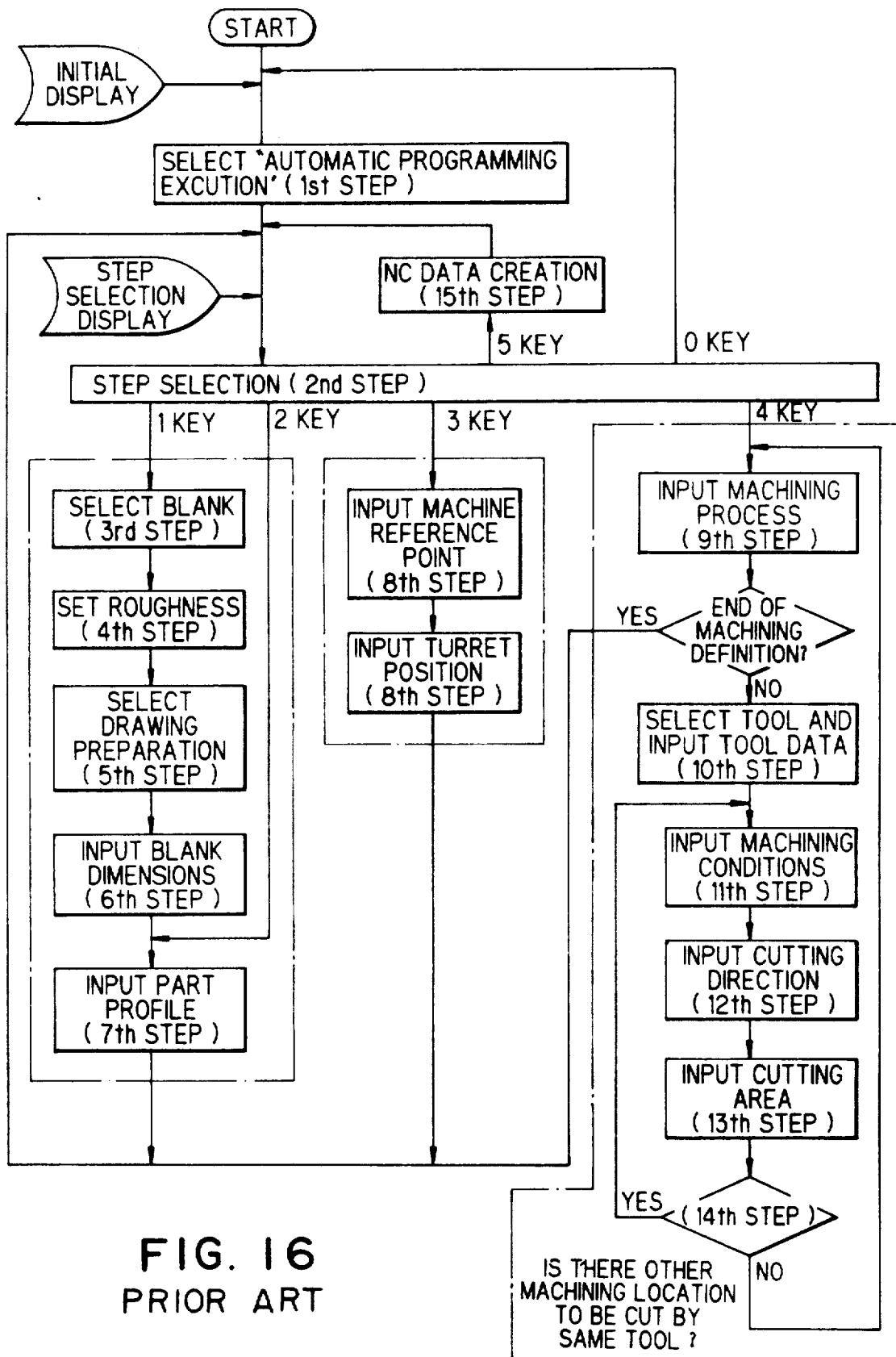
FIG. 16 is a flowchart of automatic programming processing.
Figure 17:
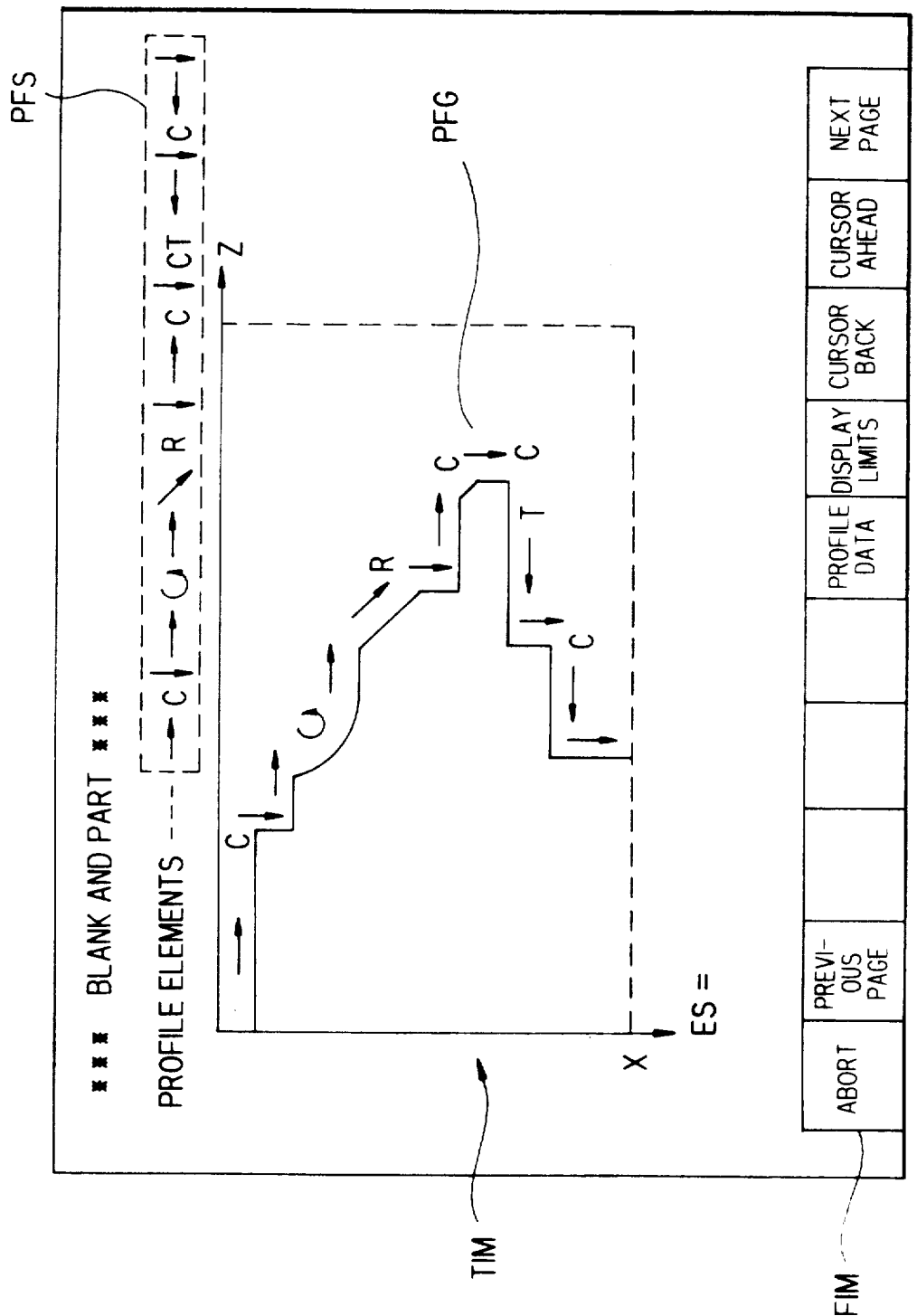
FIGS. 17 and 18 are views for describing part profile input according to the prior art.
Figure 18:
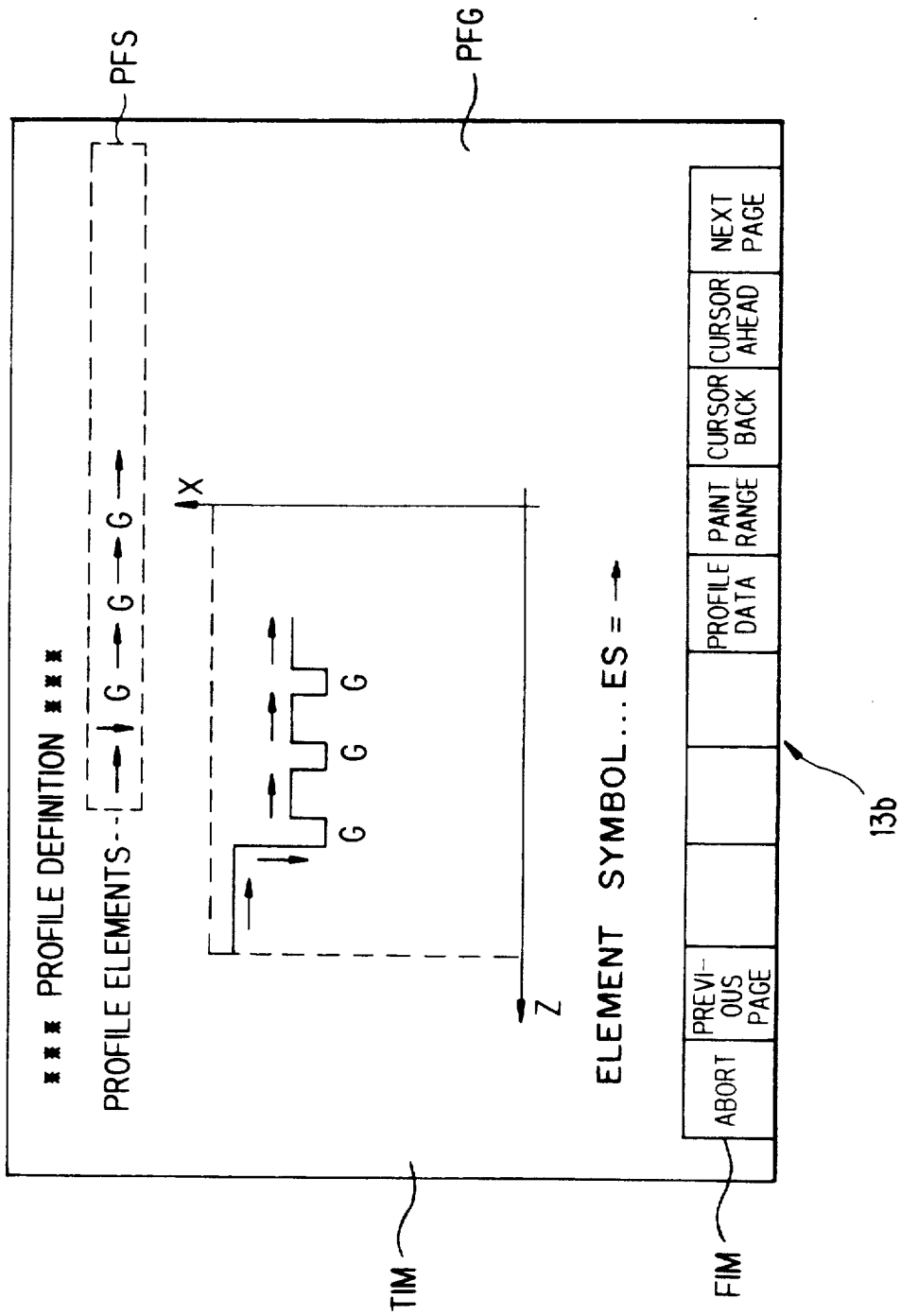

The operator operates the key 14a (FIG. 2) on the keyboard 14 to cause the changeover units 15, 16 to devote the graphic display unit 13 and keyboard 14 to the automatic programming unit 11. Thereafter, in accordance with the programming function of the automatic programming unit 11, processing up to the sixth step is executed conversationally in a manner similar to the flow of the conventional method shown in FIG. 16. If a soft key "NEXT PAGE" is pressed in the sixth step, a part profile input processing routine is started to display the part profile input screen and make possible a part profile input (see FIG. 4). Here it is determined whether it is necessary to enter a repeating shape or a standardized shape (step 101).

If it is unnecessary to enter these shapes, the operator, in response to a prompt (ES=) regarding a part profile element displayed on the display screen, enters a part profile (step 102) by operating the arrow keys ( ↑, →, ↓, ←, etc.) provided on the keyboard while observing a design drawing. Specifically, the operator presses the arrow key "→" in conformity with one part profile element $EL_1$ and, in response to a prompt calling for dimensions, enters dimensions from the design drawing. Similarly, the operator presses the arrow keys " ↓, →" in conformity with part profile elements $EL_2$, $EL_3$ and enters dimensions in response to prompts calling for the respective dimensions. In response to entry of these part profile elements, the processor of the automatic programming unit 11 paints the graphic image PFG of each of the part profile elements on the display screen (CRT) along with the symbols PSF of the part profile elements.

If it becomes necessary to enter a repeating shape or a standardized shape, the operator selects "PATTERN INPUT" PIN from the soft key display 13b and presses the corresponding soft key 13c (see FIG. 2). In response, the processor displays a menu for pattern profile selection shown in FIG. 5 on the soft key display 13b (step 103).

Examples of entering "GROOVE SERIES", "TRAPEZOIDAL GROOVE" and "NESTING CORNER" are part profiles selections will now be described.

(a) Series of groove having equal pitch

Figure 5:
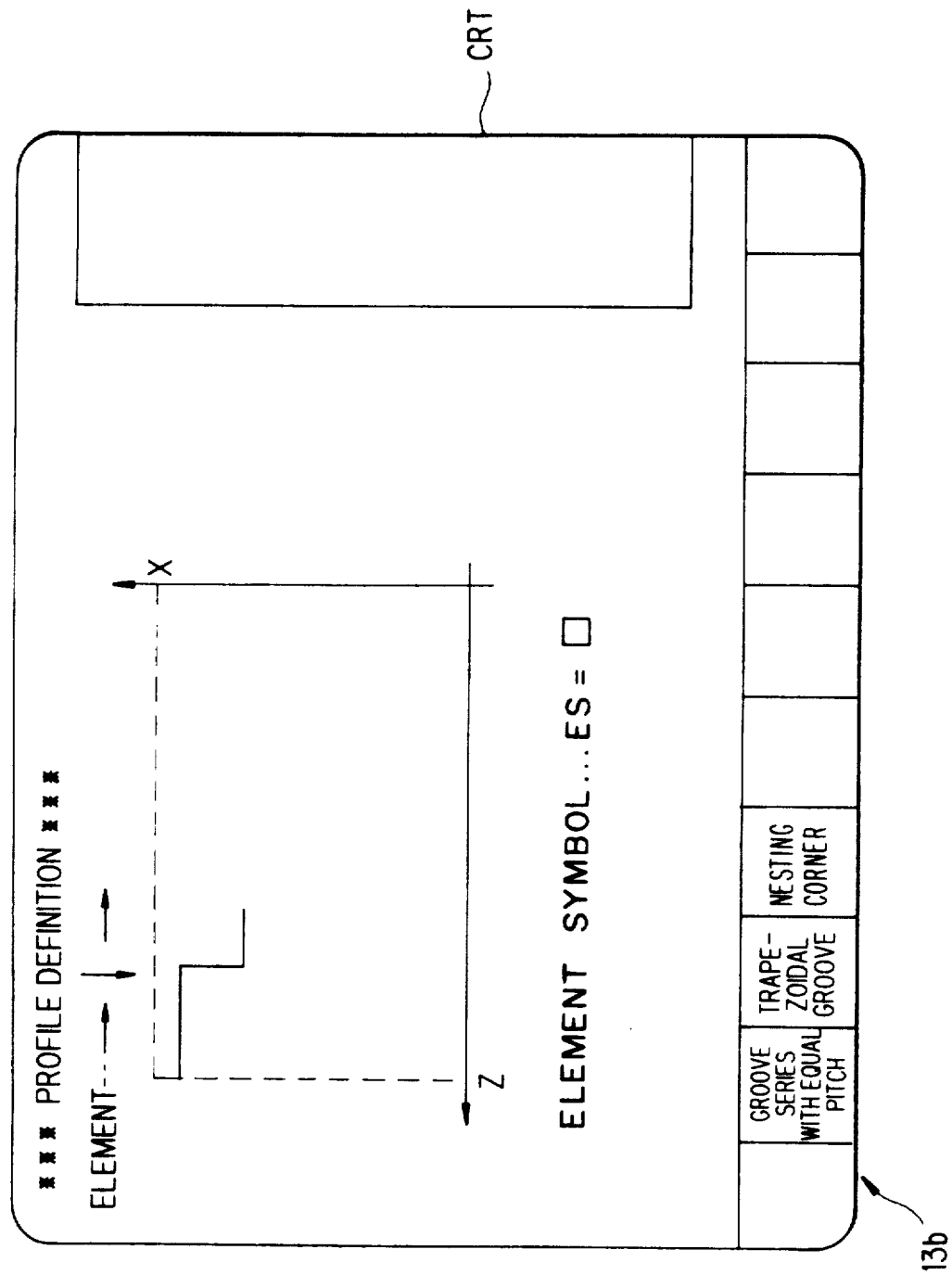
Figure 6:
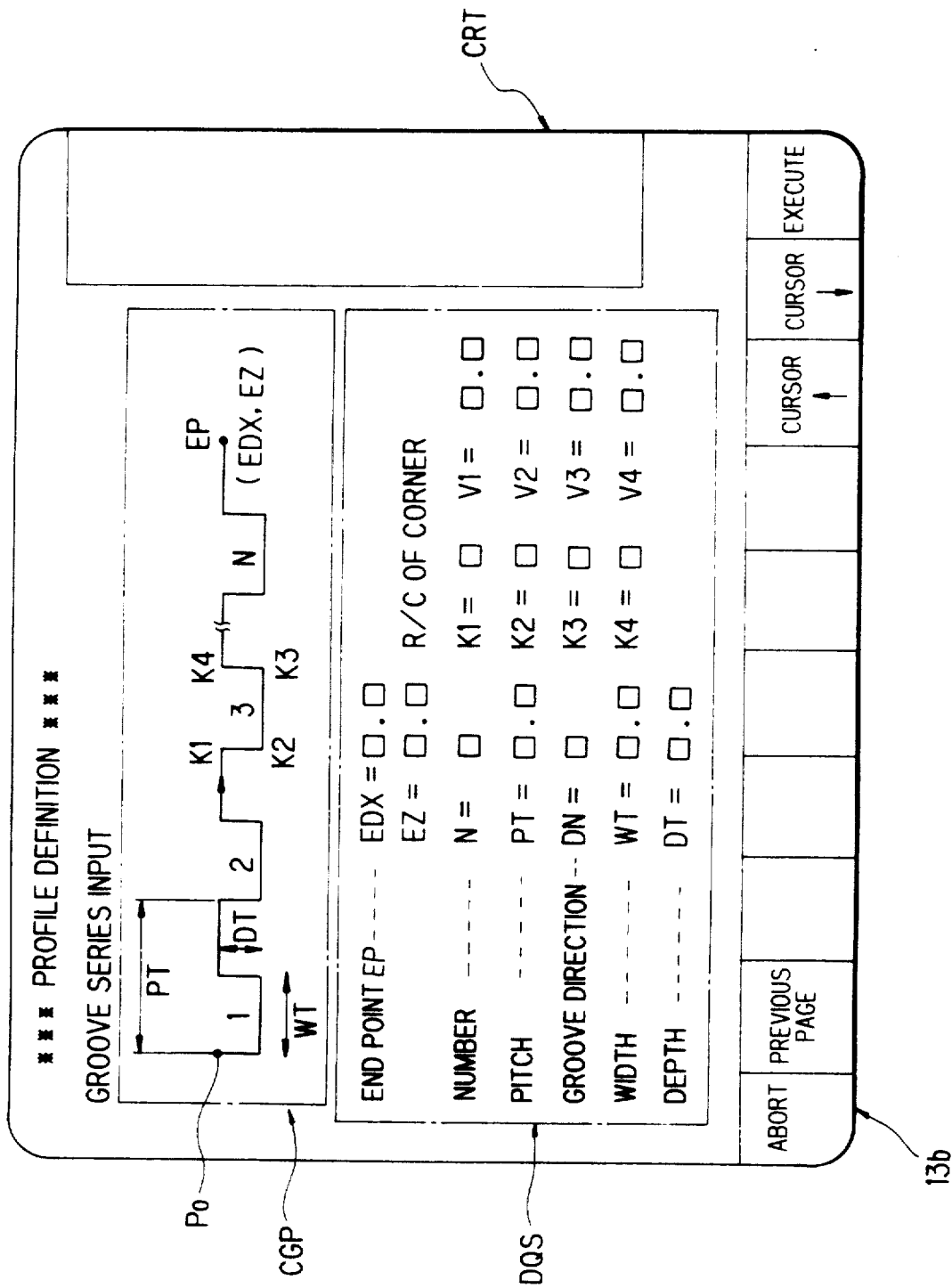
FIGS. 6 through 8 are examples of conversational displays for inputting a series of groove shapes.

When "GROOVE SERIES WITH EQUAL PITCH" is selected in FIG. 5 (step 104), the processor displays a groove series input screen on the display unit (CRT) (step 105; see FIG. 6). It should be noted that the groove series input screen includes a groove series pattern view CGP and a dimensions message DQS.

In the groove series pattern view CGP, EP signifies the end point of a pattern profile, EDX the X coordinate thereof, and EZ the Z coordinate thereof. N signifies the number of grooves, and PT signifies one groove pitch. These numerical values are entered. DN signifies the direction of a groove, this direction being entered by an arrow key. WT represents groove width and DT groove depth. $K_1$ - $K_4$ signify groove corner machining. The C key is pressed for chamfering and the R key for rounding. No entry is made if corner machining is unnecessary.

The arrangement is such that dimensions indicated by the symbols in the pattern view CGP, as well as other data, can be set by responding to the message DQS. $V_1$ - $V_4$ signify the machining dimensions of the corners set by $K_1$ - $K_4$.

The distance from the end point $P_0$ of a preceding profile element to the end point EP of the pattern profile need not be equal to an N multiple of the pitch PT; the pitch of the final groove will change depending upon the set value of the end point EP. However, it is required that the following equation be satisfied if the grooves are lined up parallel to the Z axis:

$$|EZ\text{-}SZ| \geq PT\cdot(N-1)+WT$$

and that the following equation be satisfied if the grooves are lined up parallel to the X axis:

$$|EDX-SDX|/2 \geq PT \cdot (N-1) + WT$$

If these equations are not satisfied, an error will result. SZ and SDX signify the Z and X coordinates of the end point $P_0$ of the preceding element, respectively.

Figure 7:
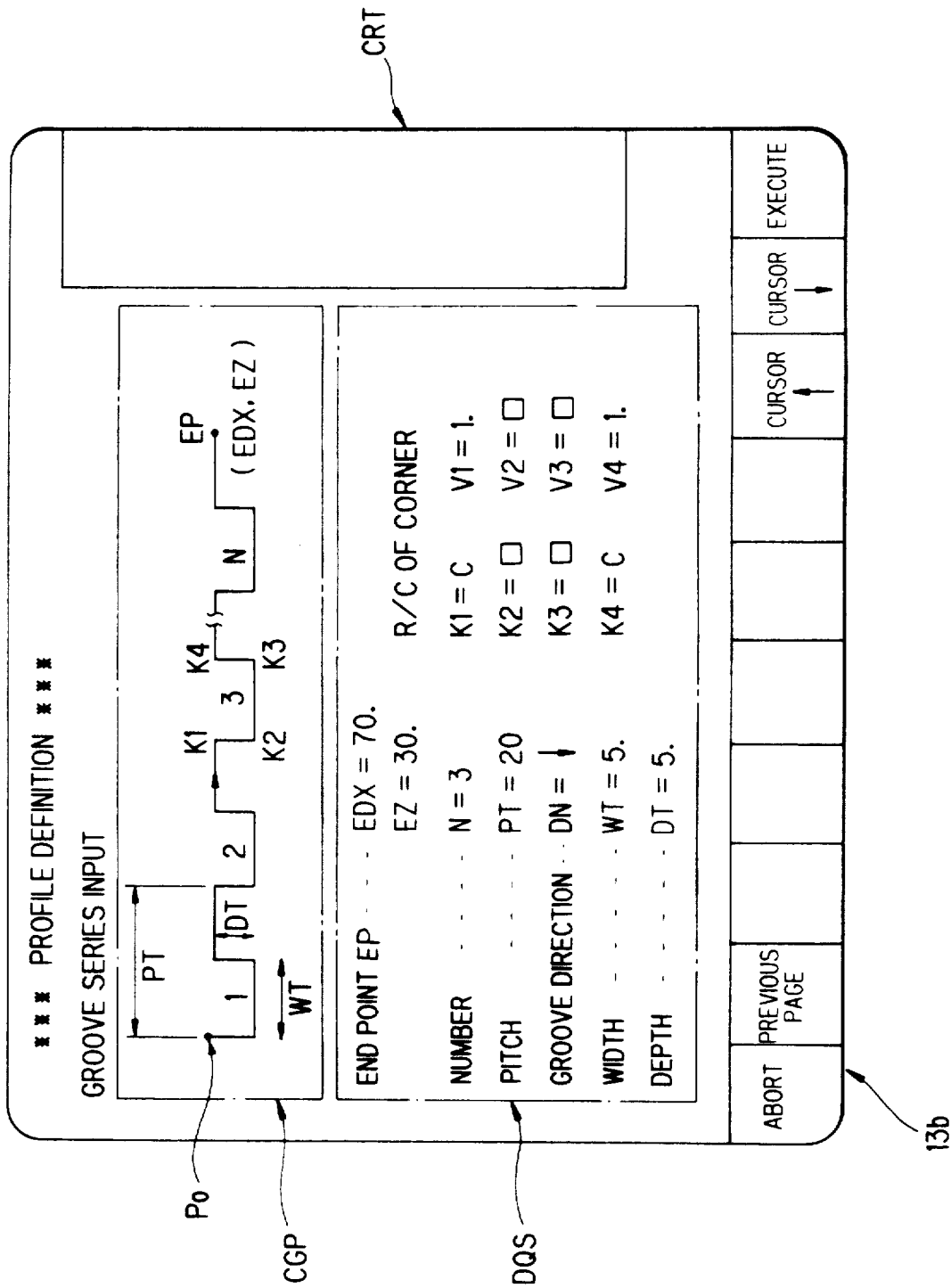

In response to the message DQS, the keyboard 14 is operated to key in numerical values and the like, as shown, for example, in FIG. 7, and the execute key NL is pressed (step 106).

Figure 8:
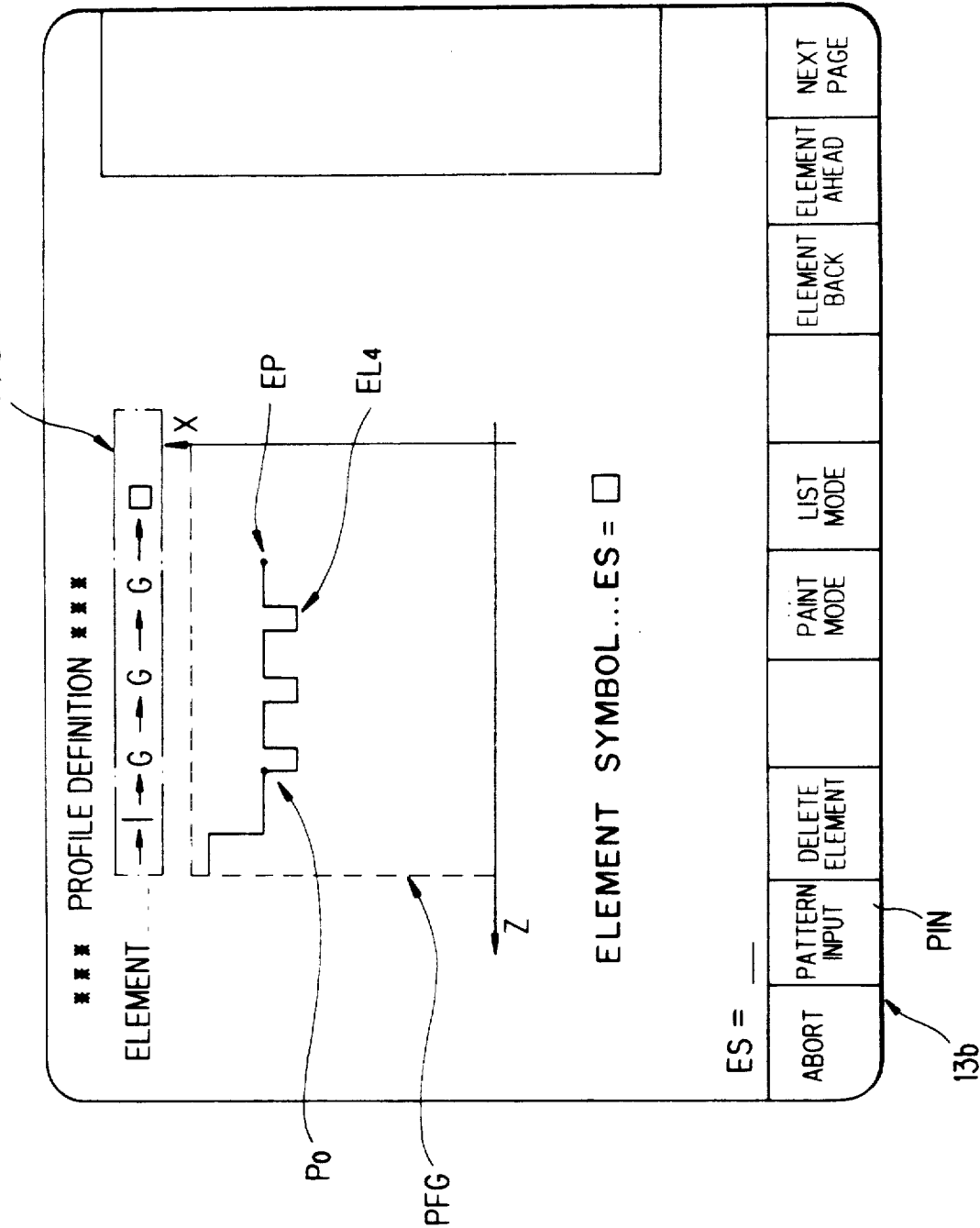

When this is done, the processor of the automatic programming unit 11 paints the groove series profile $EL_4$ on the screen at the end point $P_0$ of the part profile PFG, as shown in FIG. 8. Further, the processor breaks the defined groove series profile into profile elements one at a time, calculates and stores the dimensions thereof and displays profile element symbols "G → G → G →". In addition, the soft key display becomes the same as that shown in FIG. 4, entry of the groove series ends and entry of the next part profile becomes possible (steps 107 - 108).

Figure 9:
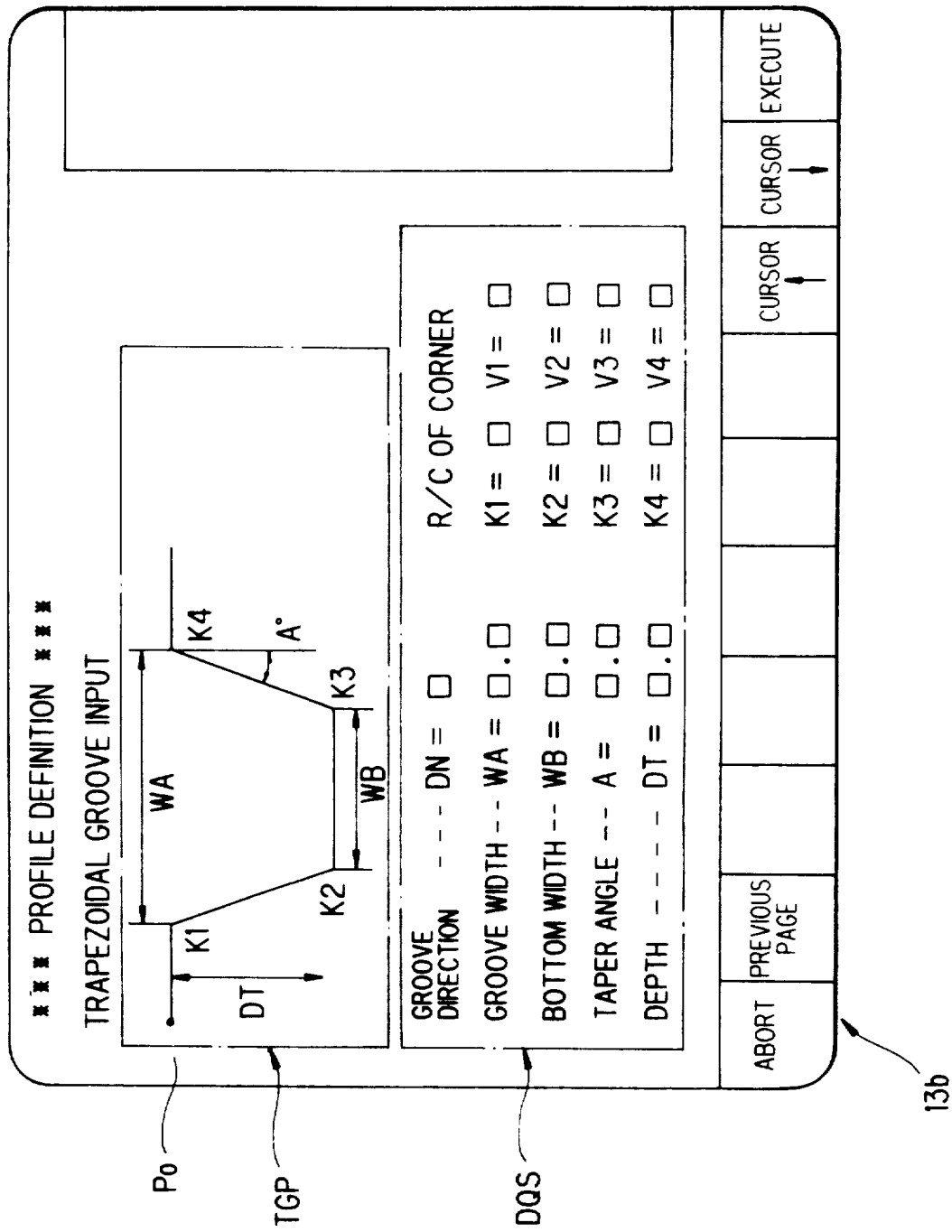
FIGS. 9 through 11 are examples of conversational displays for inputting a trapezoidal groove shape.

(b) Trapezoidal groove:

If "TRAPEZOIDAL GROOVE" is selected in FIG. 5, the processor displays a trapezoidal groove input screen on the display unit (CRT) (see FIG. 9). It should be noted that the trapezoidal groove input screen includes a trapezoidal groove pattern view TGP and a dimensions message DQS. In the trapezoidal groove, pattern view TGP, WA signifies groove width, MB signifies bottom width, A signifies taper angle, and DT signifies groove depth. $K_1$ - $K_4$ signify groove corner machining. The C key is pressed for chamfering and the R key for rounding. No entry is made if corner machining is unnecessary.

The arrangement is such that dimensions indicated by the symbols in the pattern view TGP, as well as other data, can be set by responding to the message DQS. DN represents groove direction, which direction is entered by an arrow key. $V_1$ - $V_4$ signify the machining dimensions of the corners set by $K_1$ - $K_4$.

Figure 10:
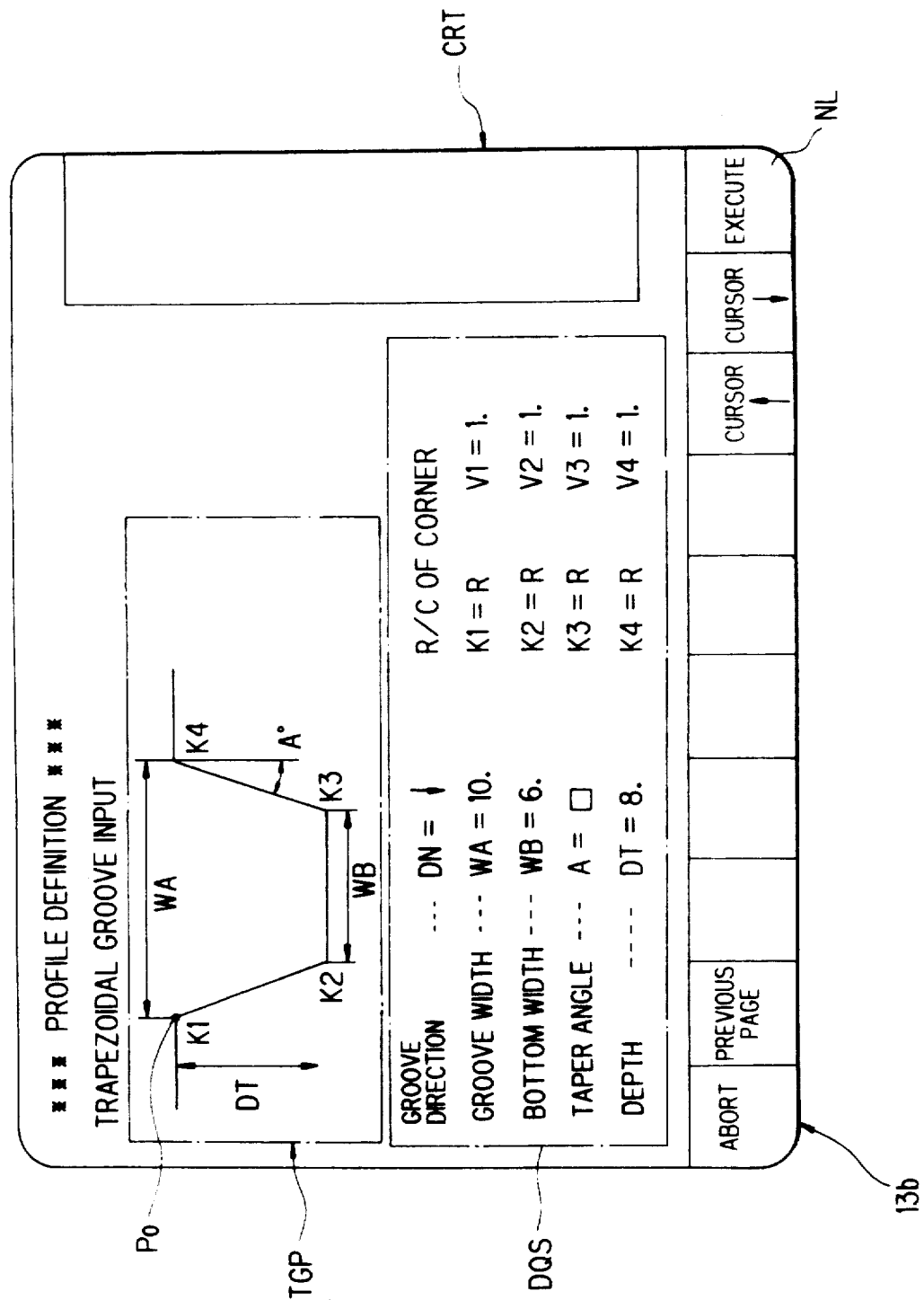
Figure 11:
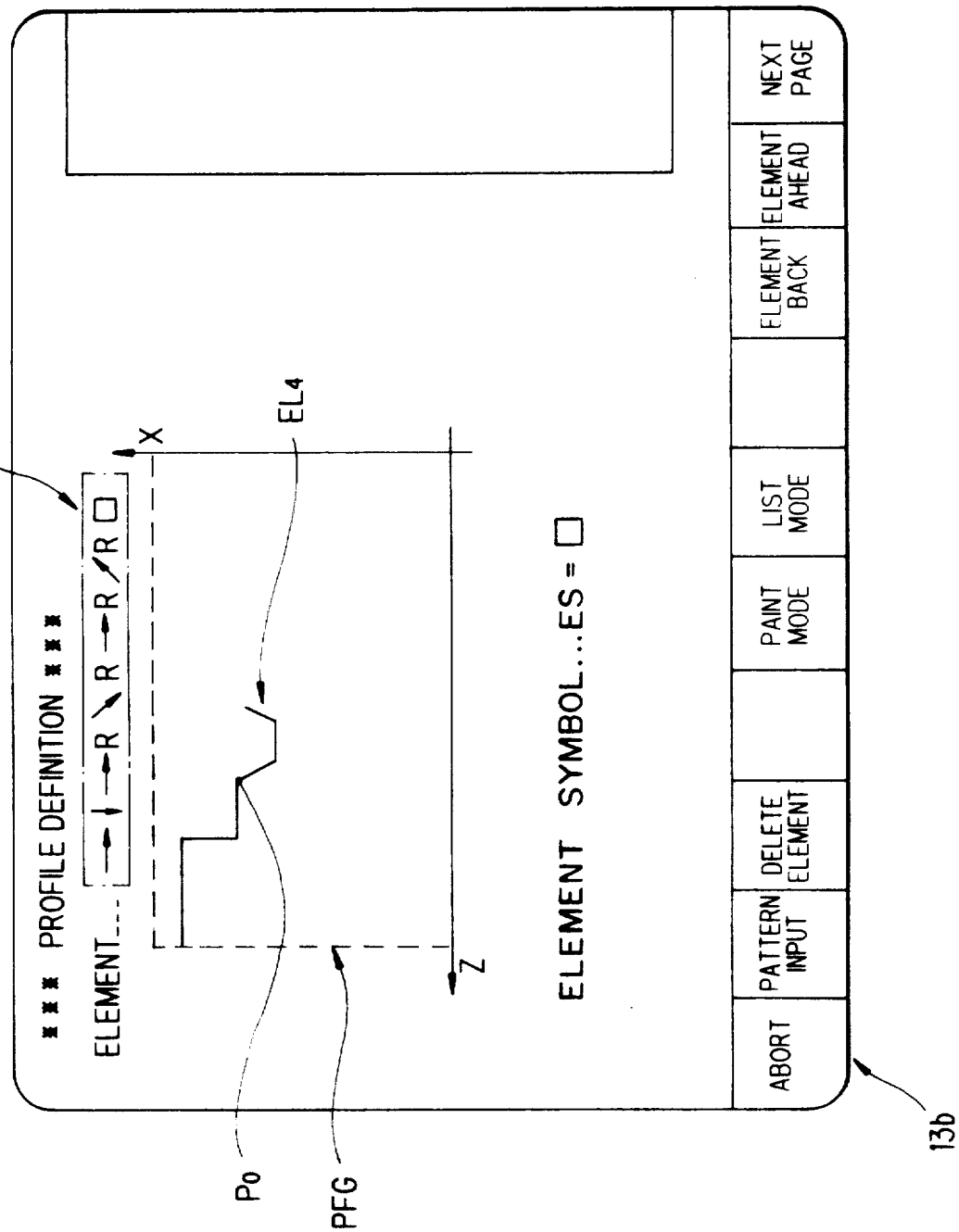

By way of example, the keyboard 14 is operated in response to the message DQS to key in numerical values and the like, as shown in FIG. 10, and the execute key NL is pressed. When this is done, the processor of the automatic programming unit 11 paints the trapezoidal groove shape $EL_4$ on the screen at the end point $P_0$ of the part profile PFG, as shown in FIG. 11. Further, the processor breaks the defined trapezoidal groove shape into profile elements one at a time, calculates and stores the dimensions thereof and displays profile element symbols "R ↘ R → R ↗ R". In addition, the soft key display becomes the same as that shown in FIG. 4, entry of the trapezoidal shape ends and entry of the next part profile becomes possible (step 201).

(c) Nesting corner

Figure 12:
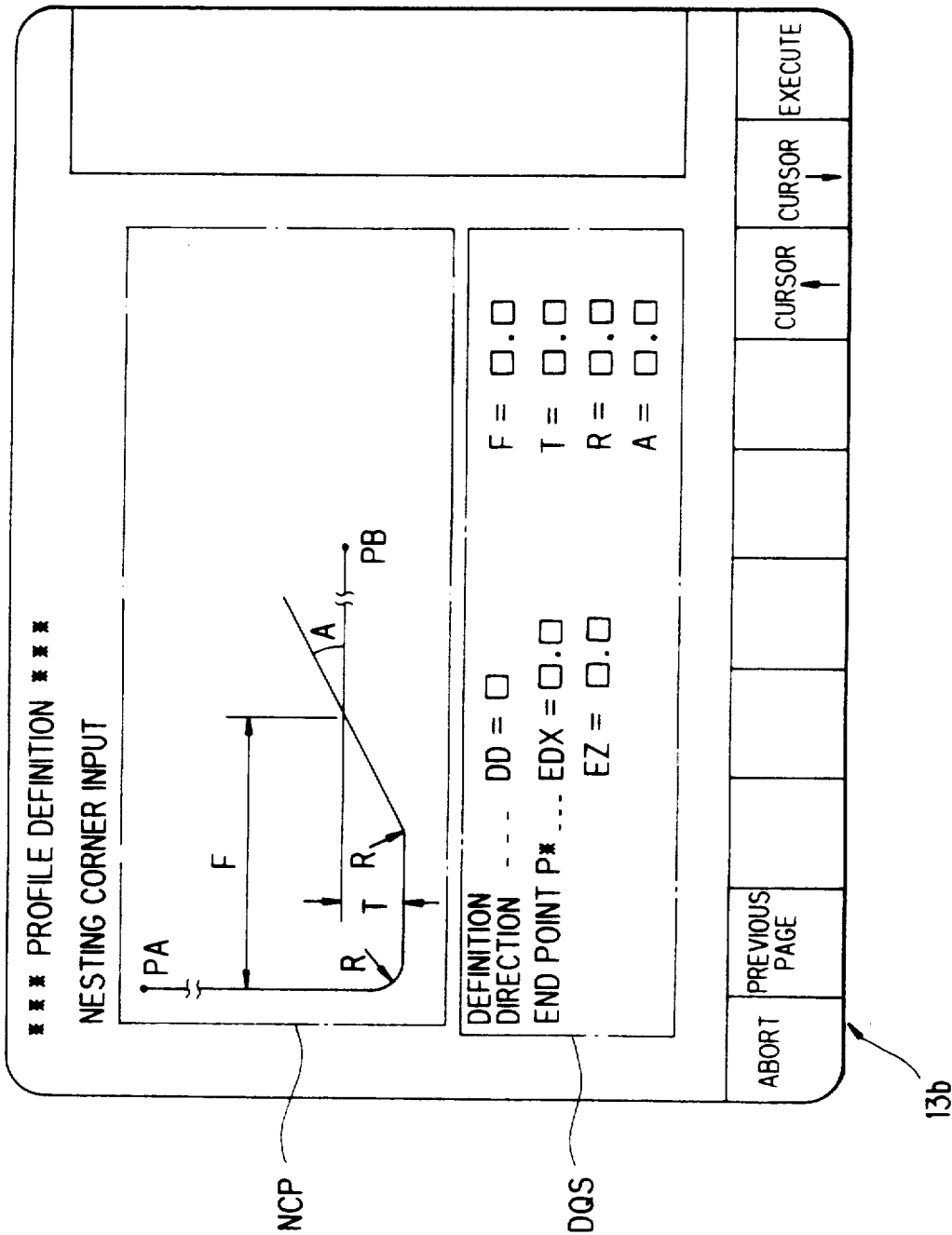
FIGS. 12, 14 and 15 are examples of conversational displays for inputting a nesting corner shape.

If "NESTING CORNER" is selected in FIG. 5, the processor displays a nesting corner input screen on the display unit (CRT) (see FIG. 12). The nesting corner input screen includes a nesting corner pattern view NCP and a dimensions message DQS. In the pattern view NCP, F signifies nesting width, T nesting depth, R rounding and A taper angle.

Figure 13A:
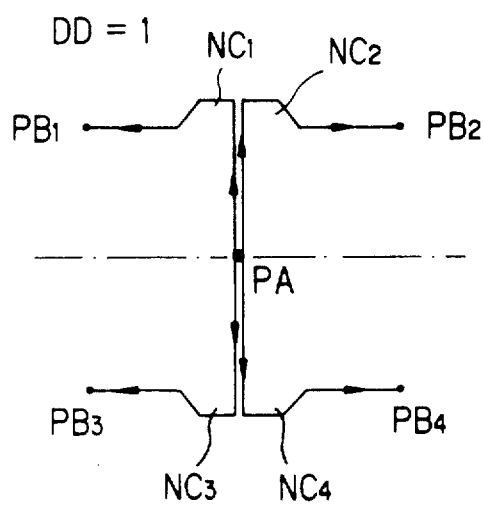
FIGS. 13(a) and 13(b) are diagrams illustrating directions for a nesting corner shape.
Figure 13B:
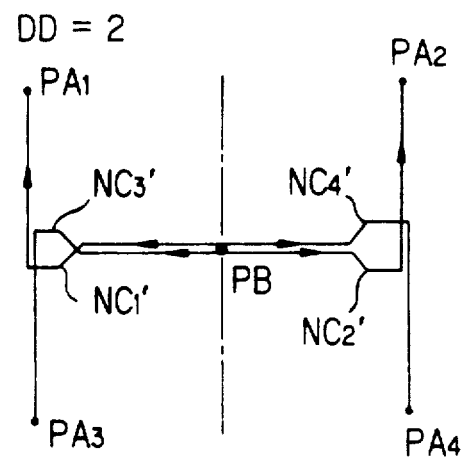

The arrangement is such that dimensions indicated by the symbols in the pattern view NCP, as well as other data, can be set by responding to the message DQS. DD signifies the nesting shape definition direction, which direction is entered by an arrow key. If, as shown in FIG. 13(a), point PA is taken as the starting point and nesting corners $NC_1$ - $NC_4$ are inserted in profile entry for arriving at any of points $PB_1$ - $PB_4$, then "DD = 1" is entered. Conversely, if, as shown in FIG. 13(b), point PB is taken as the starting point and nesting corners $NC_1'$ - $NC_4'$ are inserted in profile input for arriving at any of points $PA_1$ - $PA_4$, then "DD = 2" is entered. In the message DQS, P* signifies definition of an end point. In case of "DD = 1", * is displayed with B; in case of "DD = 2", * is displayed with A. EDX is the X coordinate of the end point, and EZ is the Z coordinate thereof.

Figure 14:
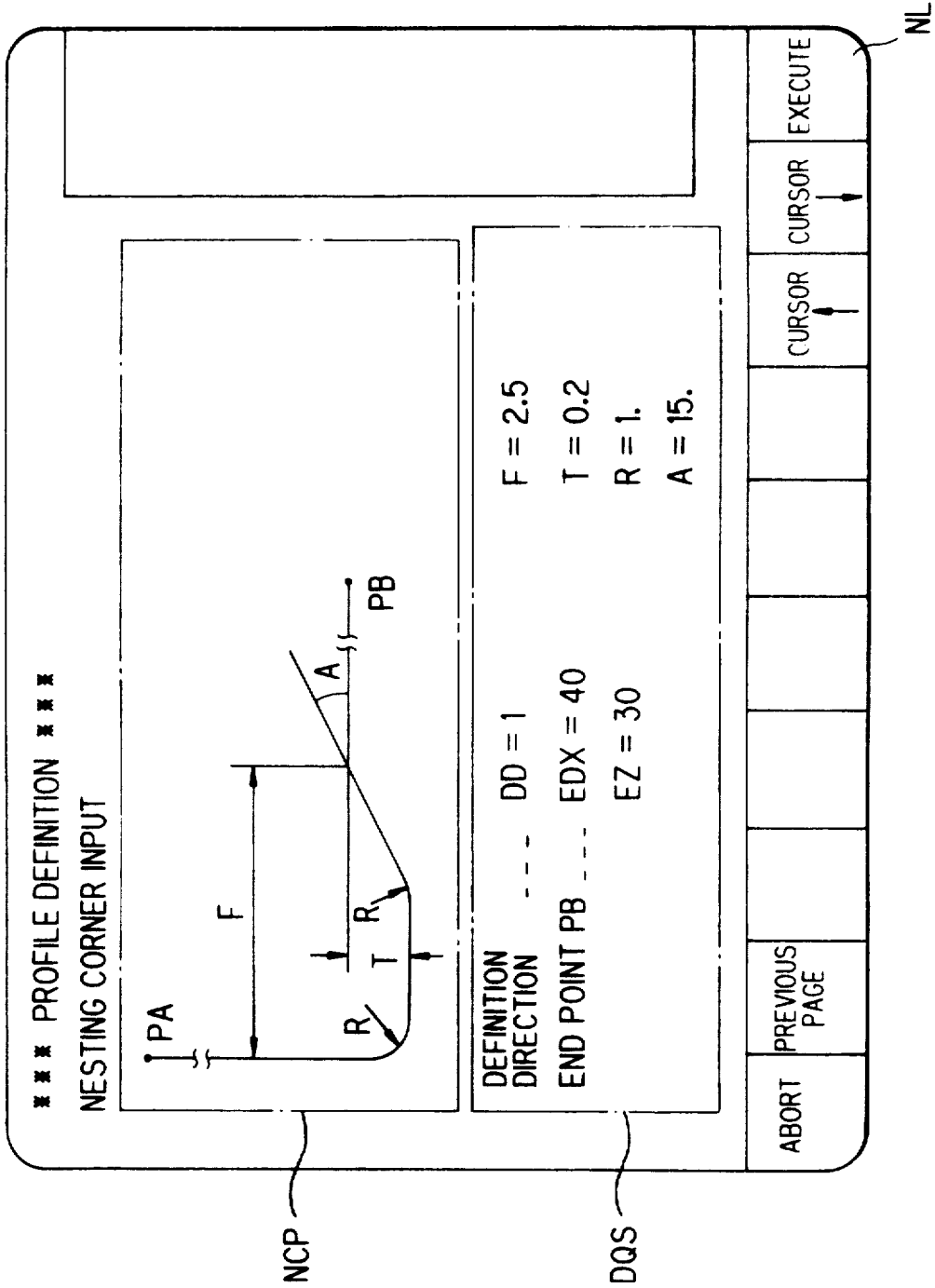
Figure 15:
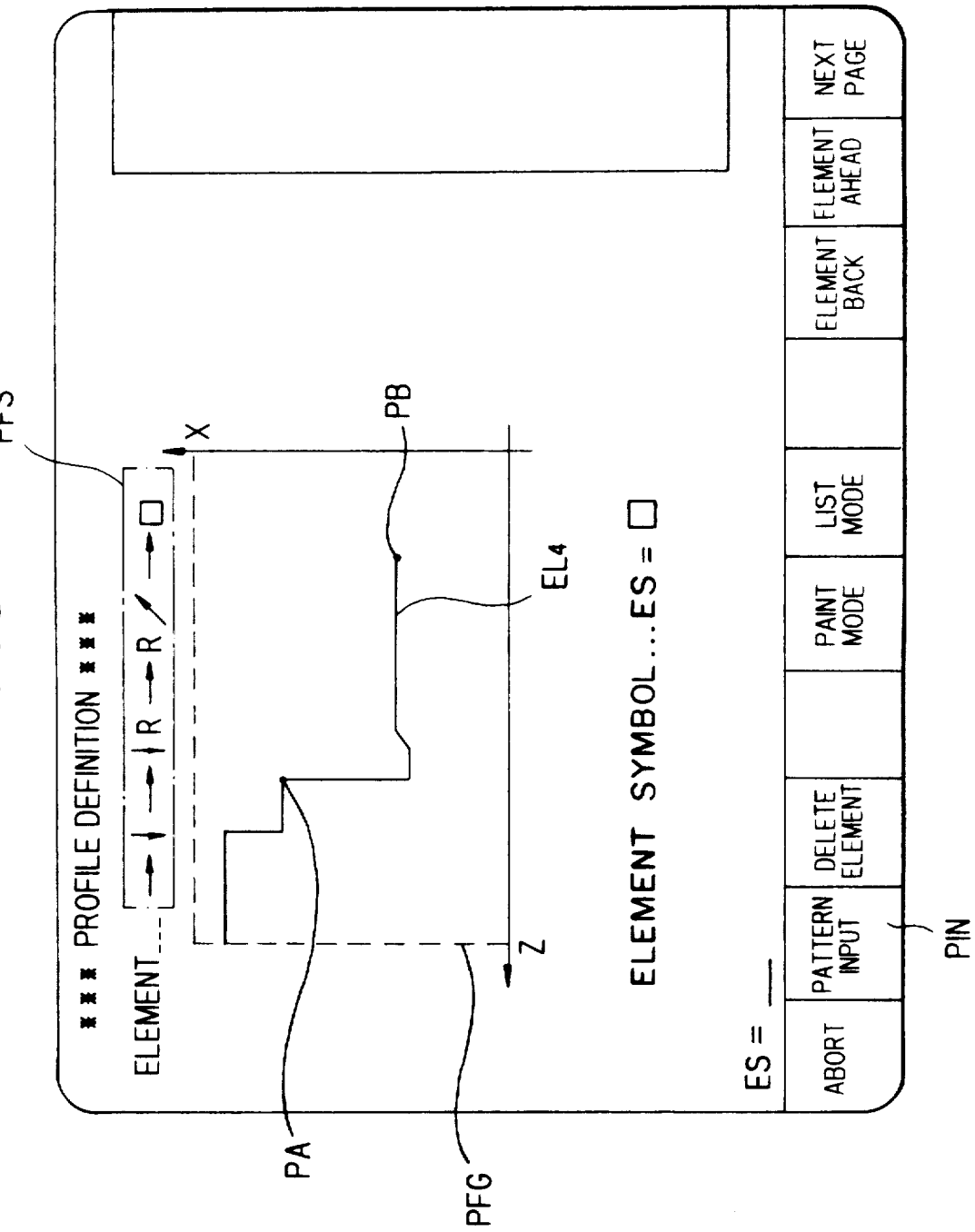

By way of example, the keyboard 14 is operated in response to the message DQS to key in numerical values and the like, as shown in FIG. 14, and the execute key NL is pressed. When this is done, the processor of the automatic programming unit 11 paints the nesting corner shape $EL_4$ on the screen at the end point $P_0$ of the part profile PFG, as shown in FIG. 15. Further, the processor breaks the defined nesting corner shape into profile elements one at a time, calculates and stores the dimensions thereof and displays profile element symbols "↓ R → R ↗ →". In addition, the soft key display becomes the same as that shown in FIG. 4, entry of the trapezoidal shape ends and entry of the next part profile becomes possible (step 301).

In a case where a profile element entered by the foregoing method is revised or deleted, this is performed one element at a time just as in the conventional method. When entry of a part profile ends (step 109), the soft key "NEXT PAGE" is pressed to display the next conversional screen, after which automatic programming processing is resumed.

In accordance with the present invention as described above, a plurality of profile menus indicating repeating shapes or standardized shapes contained in a part profile are prepared, and data such as dimensions are applied to shapes selected from the profile menus to specify the repeating shape or standardized shape. Therefore, when entering a frequently used shape, the speed and operability of the part profile input operation can be improved by eliminating the laborious task of pressing arrow symbol keys and dimension input keys each time an input is made.

We claim:

1. A part profile input method in a numerical control data creating apparatus in which a part profile is specified by inputting profile elements of a part using arrow keys and inputting coordinate values for specifying each of the profile elements, and numerical control data are created to machine a blank in accordance with the part profile specified, said method comprising the steps of:

(a) providing a plurality of profile menus for designating a profile pattern of one of a repeating shape and a standardized shape contained in the part profile;

(b) selecting a desired profile pattern using the profile menus provided in step (a);

(c) displaying the desired profile pattern selected in step (b) on a display screen and displaying a message to request various dimensions of the desired profile pattern;

(d) specifying one of the repeating shape and the standardized shape based on the various dimensions entered in response to the message;

(e) dividing one of the repeating shape and the standardized shape selected as the desired profile pattern in step (b) into separate profile elements;

(f) calculating coordinate values for specifying the separate profile elements;

(g) storing the coordinate values; and (h) displaying one of the repeating shape and the standardized shape in a form attached to the part profile previously input.

2. A part profile input method according to claim 1, wherein:

the repeating shape is a groove series and the standardized shape is one of a trapezoidal groove and a nesting corner shape.

3. A part profile input method according to claim 1, wherein step (a) includes the substep of:

displaying the profile menus on a first conversational screen.

4. A part profile input method according to claim 3, wherein step (c) includes the substeps of:

displaying a second conversational screen when the desired profile pattern is selected using the profile menus in step (b); and entering the various dimensions of said desired profile pattern in response to said message.

* * * * *